United States Patent [19]

Moeller et al.

[11] Patent Number: 5,331,404
[45] Date of Patent: Jul. 19, 1994

[54] LOW NOISE FIBER GYROSCOPE SYSTEM WHICH INCLUDES EXCESS NOISE SUBTRACTION

[75] Inventors: Robert P. Moeller, Fort Washington, Md.; William K. Burns, Alexandria, Va.

[73] Assignee: The United States of America as represented by the Secretary of the Navy, Washington, D.C.

[21] Appl. No.: 983,335

[22] Filed: Nov. 30, 1992

[51] Int. Cl.[5] .......................................... G01C 19/72
[52] U.S. Cl. .................................................... 356/350
[58] Field of Search ........................... 356/350, 345; 250/227.19, 227.27

[56] References Cited

PUBLICATIONS

Fiber Laser Sources and Amplifiers, Fesler et al, SPIE, Sep. 1989, pp. 346-352.
Liu, 10 mw Superfluorescent Electron. Lett. 23, 1320 (1987).
Duling, High-Power Superfluorescent Fiber Source Opt. Lett. 15,33 (1990).
Liu, Superfluorescent Single Mode Nd:Fiber Source at 1060 nm, in Digest of Conference on Optical Fiber Sensors (Optical Society of America, Washington, D.C., 1988), paper FDD5.
Po, Double Clad High Brightness Nd Fiber Laser Pumped by GaAlAs Phased Array, Digest of Conference on Optical Fiber Communication (Optical Society of America, Washington, D.C., 1989), paper PD7.
Fesler, Stable Fiber–Source Gyroscope, Opt. Lett. 15, 1321 (1990).
Burns, Excess Noise in Fiber Gyroscope Sources, IEEE Photon Technol. Lett 2,606 (1990).
Yurek, Quantum Noise in Superluminescent Diodes, IEEE J. Quantum Electron. QE-22, 522 (1986).

Primary Examiner—Samuel A. Turner
Attorney, Agent, or Firm—Thomas E. McDonnell; George Jameson

[57] ABSTRACT

A system and method for subtracting excess noise from a high sensitivity gyroscope system in which a laser diode array is focused into an Nd-doped active fiber. A resultant gyro signal is polarized, detected, and amplified. A noise signal is polarized, delayed, detected, and amplified such that the noise signal is polarized parallel to the gyro signal and delayed by a fiber delay, of a length equal to a length of a gyroscope fiber coil. The excess noise component in the amplified gyro signal is reduced by modulating the amplified noise signal with a portion of the amplified gyro signal and subtracting the amplitude-modulated noise signal from the amplified gyro signal to produce a reduced noise gyro signal.

18 Claims, 4 Drawing Sheets

LOW NOISE FIBER GYROSCOPE SYSTEM WHICH INCLUDES EXCESS NOISE SUBTRACTION

BACKGROUND OF THE INVENTION

The present invention relates to a high sensitivity gyroscope system with noise subtraction for reducing excess noise and random walk in the gyroscope system.

Fiber optic gyroscope systems typically use broadband sources such as superluminescent diodes (SLDs), or fiber superluminescent sources, to reduce Rayleigh scattering and polarization noise. These sources introduce an excess noise term, in addition to shot noise, due to their finite bandwidth, into the gyro output. This excess noise causes the performance of the fiber optic gyroscope systems to saturate, rather than improve, as the source power is increased. It is desirable to eliminate this excess noise component in the gyro output to achieve optimum gyroscope performance. The gyroscope system of the present application performs noise subtraction using a delayed reference signal from a source in order to reduce excess noise.

Broad-spectrum optical sources with stable spectra are required in fiber-optic gyroscopes to minimize coherent back-scattering noise and zero rotation drift due to the Kerr effect. Superluminescent diodes (SLDs) have been implemented in fiber gyroscopes, but they generally suffer from a high wavelength sensitivity to temperature, inefficient coupling to single-mode fibers, and a lack of immunity to optical feedback. Superluminescent sources exhibiting superluminescence or superfluorescence, have been observed in high-gain laser materials as a result of an essentially single-pass amplification of spontaneous photons without the use of an optical resonator. The search for practical SLSs has evolved toward wave guiding structures, which offer the advantage of high-energy confinement and therefore, large gains in compact, efficient devices.

Superluminescent fiber sources (SLSs) present several advantages over SLDs. First, the temperature stability of the SLS spectrum, in particular, its center wavelength, is far superior to that of the semiconductor devices, whose emission wavelength typically varies by about 0.05 nm/deg C. Second, the available power in an SLD is significantly less than the available power in a superluminescent fiber source (SLS). For example, in a typical SLD, the available power is approximately 30 mW, of which probably no more than a few milliwatts can be coupled to a single mode fiber. Third, in a practical system, unwanted spurious reflections from the source/system interface can greatly reduce the power which can be coupled to the system fiber. These reflections can be minimized in the SLS fiber device by splicing the source and system fibers with a fused glass-to-glass splice, which can not be realized with SLDs. Finally, the high conversion efficiency of the SLS fiber source and its broad character pump band make superluminescent fiber sources (SLSs) ideal in compact, laser-diode-pumped configurations.

Nd-doped single-mode fibers have been utilized as a superfluorescent source in SLSs to provide a wide bandwidth and high power for use in applications where sharp spectrum components from a broadband laser would be undesirable, such as in a fiber gyroscope. Further, systems have been designed in which an Nd-doped fiber is pumped by a laser diode to produce over 80 mW of superfluorescent output at a wavelength of 1060 nm. Further, high-power superfluorescent sources have been demonstrated which are pumped by a high power broad-striped diode laser. The output characteristic with pump power has permitted the modeling of the superfluorescent emission and a determination of the fiber constants characterizing saturation, spontaneous emission, and gain. Further, in these systems, evidence of lasing in the absence of external feedback has been observed in particular configurations and is shown to correlate with Rayleigh backscattering levels in the fiber.

A double clad, high brightness Nd fiber laser has been pumped by a GaAlAs diode array. As illustrated in FIG. 1, the fiber laser includes an Nd core in the center, a first cladding, which is approximately rectangular in shape, which allows for efficient pump light absorption and is made of glass, and a second cladding, which is made of a soft fluoro-polymer, which increases an acceptance angle for the pump light, and has a refractive index of 1.39. Further, the fiber laser includes an outer buffer coating which is a commercial hard polymer. Since the first cladding is mainly $SiO_2$, the numerical aperture (NA) between the first and second cladding is approximately 0.4. The core contains 0.5 weight % of $Nd_2O_3$, 3.8 weight % $Al_2O_3$, and an NA of 0.16. Further, the dimensions of the first cladding are 110 microns by 45 microns, and the core is 4.8 microns in diameter. This configuration gives a ratio of the first cladding area to the core area of 274. The rectangular shape of the first cladding and its NA of 0.4 make is especially suited for high powered diode array pumps.

Excess noise is important with respect to broadband optical sources which are commonly used in fiber optic gyroscopes because the excess noise can limit the ultimate sensitivity of the device. Models for excess noise have been used to calculate the random walk coefficient due to shot and excess noise in a fiber gyro to demonstrate the impact excess noise in these sources will have on such a gyroscope. Experiments in this area have indicated the gyros utilizing SLD sources are not significantly impacted by excess noise due their limited output power (a few mW in a single mode fiber). However, a fiber source at 1.06 microns, for example, with its higher potential output power, is limited by excess noise.

Excess noise in a broadband source arises due to intensity fluctuations. Gaussian intensity fluctuations lead to a Bose-Einstein, rather than a Poisson, photoelectron distribution, which leads to an additional, or "excess" noise term in the mean square fluctuation of the photoelectron current. This phenomenon is represented by:

$$<(\Delta I)^2> = 2e<I>B + <I>^2 B/\Delta v \quad (1)$$

where $<>$ represents a time average, I is the detector current, e is the electron charge, B is the electronic bandwidth, and $\Delta v$ is the optical linewidth of the source. In Equation (1), the first term is referred to as the shot noise term and the second term is the excess noise term.

Broadband sources have been used in optical gyros to reduce noise due to Rayleigh backscatter, Kerr effect, and polarization fluctuations. The minimal detectable rotation rate as limited by shot noise in a fiber gyro, is shown below. If both the shot and excess noise terms from Equation (1) are included, the result is:

$$\Omega_{min} = \frac{\lambda c}{4\pi RL}\left(\frac{1+J_0}{J_1}\right)\left(\frac{e}{<I>} + \frac{\lambda^2}{2c\Delta\lambda}\right)^{1/2}\sqrt{B} \quad (2)$$

where $\Omega_{min}$ is the minimal detectable rate, R and L are the radius and length of the gyro coil, $J_0 = 0.34$ and $J_1 = 0.58$ are Bessel functions optimized for maximum sensitivity, c is the speed of light, and $\lambda$ and $\Delta\lambda$ are the free space center wavelength and linewidth of the source. By dividing both sides of Equation (2) by $\sqrt{B}$, a bandwidth independent constant characteristic of white noise, $\Omega_{min}/\sqrt{B}$, is obtained, usually referred to as the random walk coefficient and expressed as $(deg/h)/\sqrt{Hz}$ or $deg/\sqrt{h}$. As illustrated in Equation (2), the random walk coefficient depends on the source linewidth, as well as, coil configuration, detector current, and source wavelength.

Excess noise measurements on several types of SLDs and a superfluorescent Nd-doped fiber source have been performed. The spectra of the Nd-doped fiber source, illustrated in FIG. 2 is unique in that the spectra has a long wavelength "tail" which broadens the linewidth considerably compared to the width of the main peak near 1.06 microns. The results of the comparison of excess noise between the several types of SLDs and the superfluorescent Nd-doped fiber source indicate that maximum SLD outputs available are in the transition region between shot noise and excess noise limited operation. However, since the Nd-doped source utilizes much higher powers (10 to 40 mW), the Nd-doped source falls in the excess noise limited regime, and as a result the signal-to-noise ratio (SNR) will not increase. This excess noise is important for fiber optical gyros because it imposes a limitation which does not arise in optical gyros which use narrow band sources.

In summary, fiber superluminescent sources (SLSs) are desirable due to their high power output and broad spectrum. However, because of their high output, "excess noise" prevents optimum performance. Therefore, a need in the art exists for an apparatus and method for solving the problem of excess noise, by utilizing a gyroscope system including noise reduction means for reducing the excess noise component in the gyroscope signal. The noise subtraction would, therefore, allow fiber superluminescent sources to be operated at even higher source powers.

SUMMARY OF THE INVENTION

Accordingly, a primary object of the present invention is to provide a system and method for reducing the excess noise generated in a gyroscope system utilizing a fiber gyroscope, fiber delay means, and noise reduction means for reducing an excess noise component in an amplified gyro signal.

Another object of the present invention is to provide both an open and closed loop gyro system with reduced excess noise.

Another object of the present application is to provide a superfluorescent fiber source for use in the gyroscope system.

A further object of the present application is to provide noise reduction means for reducing the excess noise in a gyro signal.

These objects of the present invention are fulfilled by providing a gyroscope system, said gyroscope system comprising:

a fiber gyroscope for detecting and amplifying a gyro signal;

fiber delay means, coupled to said fiber gyroscope, for delaying, detecting, and amplifying a noise component of the gyro input light; and noise reduction means for reducing the noise component of the amplified gyro signal by amplitude-modulating the amplified noise component with the amplified gyro signal and subtracting the amplitude-modulated noise component from the amplified gyro signal to produce a reduced noise gyro signal.

The objects of the present invention are further fulfilled by providing a method for reducing excess noise in a gyro signal output by a gyroscope system, said method comprising the steps of:

a) detecting and amplifying the gyro signal;

b) delaying, detecting, and amplifying the noise component of the gyro input light; and c) reducing the noise component of the amplified gyro signal by amplitude-modulating the amplified noise component with the amplified gyro signal and subtracting the amplitude-modulated noise component from the amplified gyro signal to produce a reduced noise gyro signal.

These and other objects of the present invention will become more readily apparent from the detailed description given herein after. However, it should be understood that a detailed description and specific examples, while indicating preferred embodiments of the invention, are given by way of illustration only, since various changes and modifications within the spirit and scope of the invention will become apparent to those skilled in-the art from this detailed description.

BRIEF DESCRIPTION OF THE DRAWINGS

The present invention will become more fully understood from the detailed description given hereinbelow in the accompanying drawings, which are given by way of illustration only and thus are not limitative of the present invention and wherein.

It should be noted that throughout these drawing figures, like numerals represent like elements.

DETAILED DESCRIPTION OF THE PREFERRED EMBODIMENT

As discussed above, there is great interest in the use of fiber superfluorescent sources in fiber-optic gyroscopes as a replacement for semiconductor superluminescent diodes (SLDs). Potential benefits include higher available power, better wavelength stability with temperature, and improved lifetime. Multicore Nd-doped fibers, pumped by laser-diode-arrays or broad-stripe lasers offer high output power in a single-mode core but are susceptible to lasing owing to feedback from reflections or Rayleigh back-scattering. This type of diode-laser-pumped source has been successfully employed in a fiber gyroscope by using a backward pumping scheme in order to avoid feedback. The all-fiber gyroscope of the present application utilizes a similar source, however, the source in the present gyroscope is forward-pumped with the use of an optical isolator. Further, the gyro of the present application utilizes all spliced fiber components after the source fiber. Excess noise has been a problem with fiber broadband sources as a result of their somewhat narrower (compared with that of SLD's) emission spectrum. The all-fiber gyroscope of the present application discloses means for subtracting excess noise from the gyro signal, in either an open or closed loop gyroscope system, in order to remove this excess noise.

Figure 1:
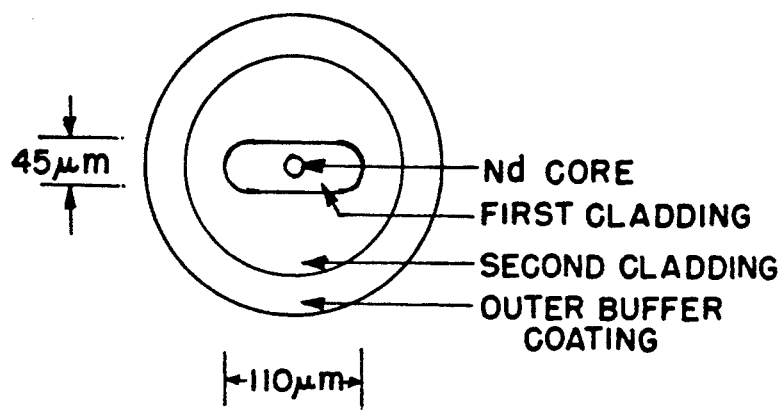
FIG. 1 illustrates the Nd-doped active fiber utilized in the gyroscope system of the present invention.
Figure 3:
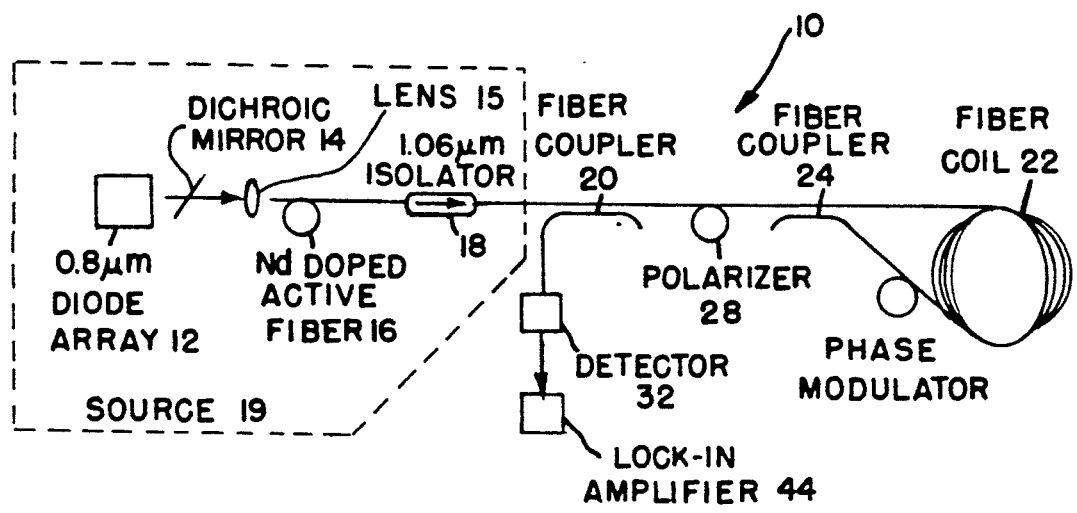
FIG. 3 illustrates the gyroscope utilized in the gyroscope system of the present invention.

The fiber gyroscope 10 of the gyroscope system of the present invention is illustrated in FIG. 3. An exemplary 0.5 watt GaAlAs laser diode-array pump 12 (0.81 microns) is focused by a lens 15 into an end of a Nd-doped active fiber 16 through a dichroic mirror 14. The dichroic mirror 14 isolates a backward 1.06 micron emission from a facet 11 of the diode array 12. The multicore (multimode pump, single mode at 1.06 microns) Nd-doped fiber 16 has a structure as illustrated in FIG. 1. The active fiber 16 is spliced to a pigtail of the 1.06 micron isolator 18 with a 4 db insertion loss, which in turn is spliced to an input coupler 20 of the open-loop gyro 10. The elements 12, 14 16 and 18 comprise an SLS source 19 which is typically, and in this description, preferably unpolarized (depolarized). The splices on either side of the isolator 18 have insertion losses of approximately 1 db each, and the gyro circuit insertion loss is 22.5 db. A fiber coil 22, of about 1 km in length and quadrapole wound on a 16 cm radius, is also utilized as shown in FIG. 3.

Figure 4:
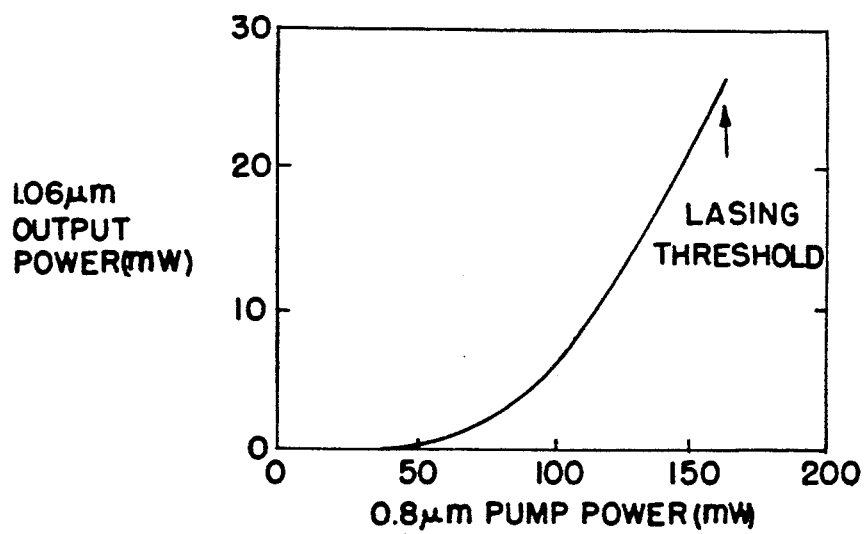
FIG. 4 is a graph plotting output power of the source fiber utilized in the gyroscope of the present invention for an 8 m length of Nd-doped fiber.

The source fiber 16 is isolated from feedback at its output end by the 1.06 micron isolator 18, which has a 30 db isolation. At the pumped end, isolation is achieved with an angled cleave which has an approximate effective reflectivity of 0.0027. For optimization purposes, the source fiber 16 was removed from the isolator 18 and isolated from feedback at the output by index-matching gel. Under these conditions, the pump power can easily be increased to a power required to induce lasing from Rayleigh backscattering in the fiber 16. The output power without lasing was increased by reducing the length of the active fiber 16. When the active fiber 16 length is 8 m, the output characteristics illustrated in FIG. 4 are achieved. The Nd-doped active fiber 16 was then spliced to the isolator 18, and essentially the same output characteristic was obtained, taking into account the splice and isolator insertion losses. Typical operating numbers are 6 mW of 1.06 micron source input power to the gyro first coupler 20, which produces 35 μW of power at the gyro detector 32, for 140 mW of pumped power at 0.81 microns.

Figure 2:
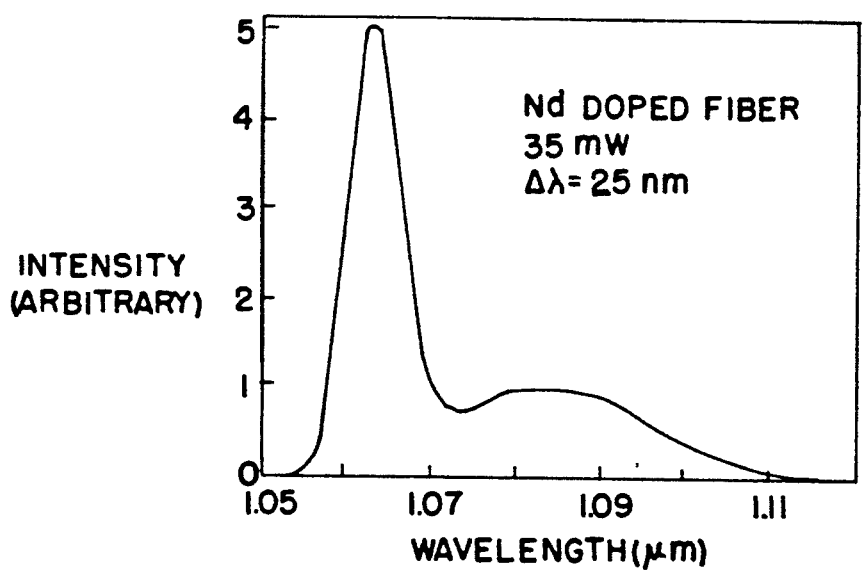
FIG. 2 is a graph illustrating a typical spectra of Nd-doped fiber sources similar to that utilized in the gyroscope system of the present invention.

As a result of doping the multi-mode Nd fiber 16, the source optical linewidth is only 6.8 nm wide, which is considerably less than that of other similar fibers. In effect, the long wavelength tail shown in FIG. 2 is absent, leaving only a single peak near 1.06 microns. The measured random walk coefficient for the gyroscope system 10 of FIG. 3 is $7.3 \times 10^{-4}$ deg/$\sqrt{h}$, in close agreement with the calculated value from the spectral width of $6.7 \times 10^{-4}$ deg/$\sqrt{h}$, using the excess noise formula.

Figure 5:
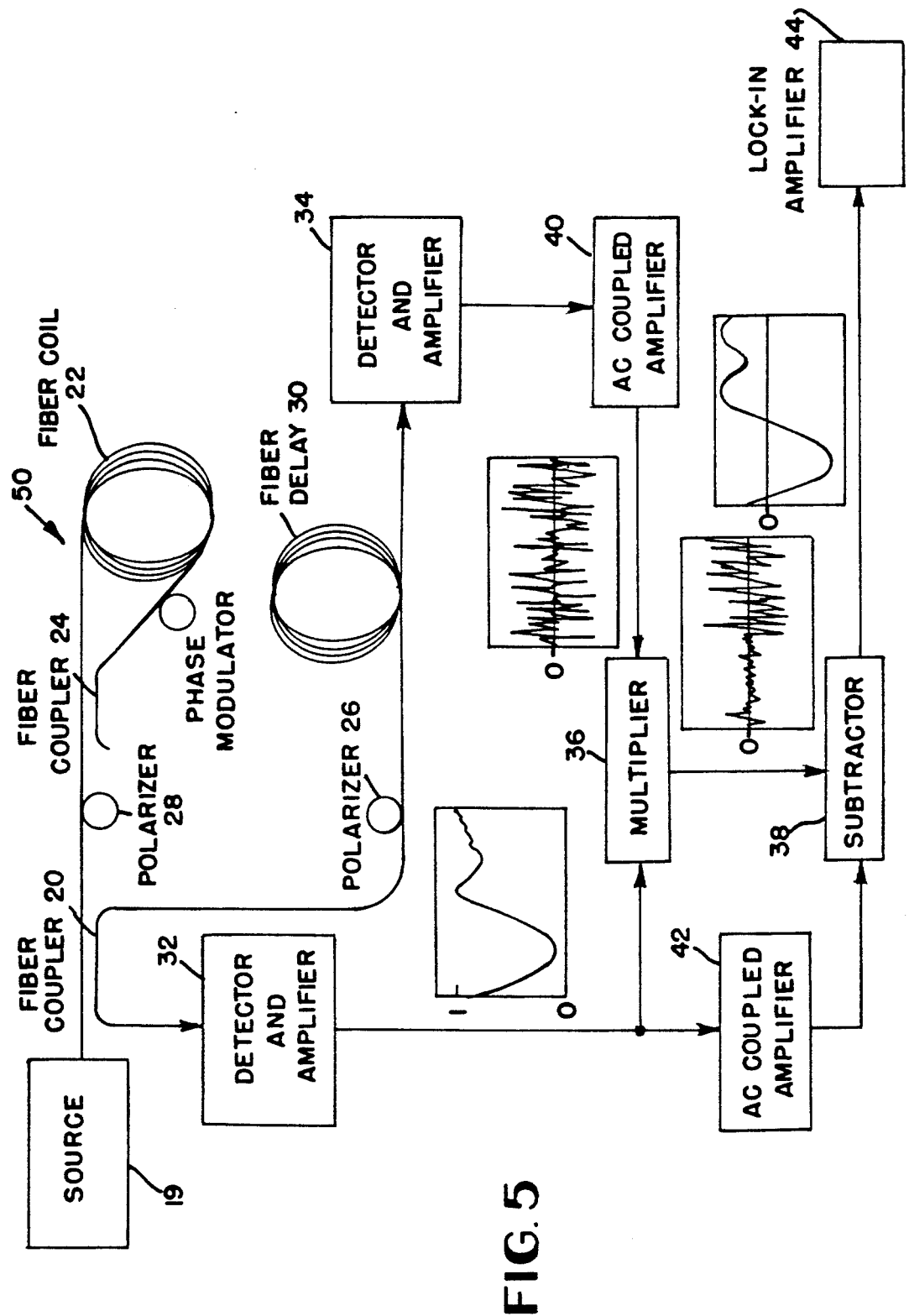
FIG. 5 illustrates a preferred embodiment of the gyroscope system of the present invention with noise traces magnified by $2.5 \times 10^4$ for illustration.

The configuration for the gyroscope system 50 with noise substraction is illustrated in FIG. 5. The gyroscope system 50 comprises three main parts:

1) an open loop fiber optical gyroscope with an optical detector,
2) a fiber delay segment, coupled to a tap of a coupler of the fiber gyro, including a fiber polarizer, a fiber delay, and an optical detector, and
3) a noise reduction section, including two amplifiers, a multiplier, and a subtractor.

A fiber polarizer 26 is spliced to an unused tap of the input coupler 20, aligned such that the fiber polarizer's 26 transmission axis is parallel to the transmission axis of the gyro polarizer 28. Since the source 19 is depolarized, this ensures that the gyro signal and the noise signal have the same intensity noise components. The noise signal is then delayed through a fiber delay 30 of about 1 km of ordinary single-mode fiber, equivalent to the length of the gyro coil 22. Both of the gyro and noise signals are then detected and amplified in detector and amplifier circuits 32 and 34, respectively.

Figure 6A:
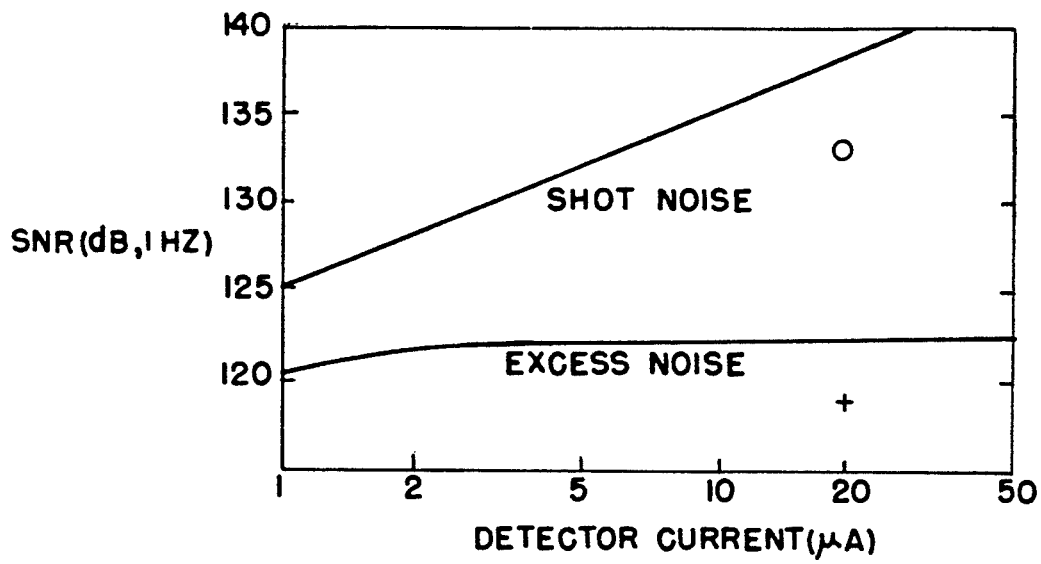
FIG. 6(A) illustrates signal-to-noise ratio versus detector current both with (O) and without (+) noise subtraction.

FIG. 6(A) illustrates the signal-to-noise ratios (SNR), with (O) and without (+) noise subtraction, compared with theoretical shot noise and the theoretical excess noise. The gyroscope of the present invention obtains a 14 db (electrical) noise improvement, which indicates that the polarizer alignment and delay length are appropriate. Without the polarizer 26 in the reference branch of FIG. 5, essentially no noise reduction is obtained.

However, an operating fiber gyro, such as the one illustrated in FIG. 3, has a time-varying output signal, whereas the noise signal is DC. The noise signal cannot simply be subtracted from the gyro signal at this point, as the signal and noise levels must be balanced to accomplish effective noise subtraction. The amplitude of the noise in the DC-coupled gyro signal is proportional to the strength of that signal. To achieve a properly modulated noise signal, the detected and amplified noise signal from the detector and amplifier 34 is AC-coupled through the AC-coupled amplifier 40 and a portion of the gyro signal is tapped off at a tap point at the output of the detector and amplifier 32. These two signals are multiplied together in a multiplier 36 to produce an amplitude-modulated noise signal whose amplitude varies in the same way as the gyro output intensity varies.

The gyro signal is AC-coupled by AC-coupled amplifier 42 and then the amplitude-modulated noise signal is subtracted from the AC-coupled gyro signal in a subtractor 38. The output of the subtractor 38 is the gyro signal with reduced noise.

These operations are indicated by the signal and noise traces shown in FIG. 5. The output of the subtractor 38 is then demodulated in a lock-in amplifier 44. The analog multiplier 36 includes an AD734 four-quadrant multiplier with 10-Mhz full power bandwidth. Modulation of the delayed reference noise is thus kept in phase with the gyro output signal at the piezoelectric drive frequency and all its strong harmonics.

In order to determine the effect of the noise subtraction, the noise floor of the gyro output signal must be analyzed on a spectrum analyzer. The improvement in the gyroscope system of the present application was determined to be a 10 dB (electrical) reduction of the noise floor when the modulated noise was subtracted.

Figure 6B:
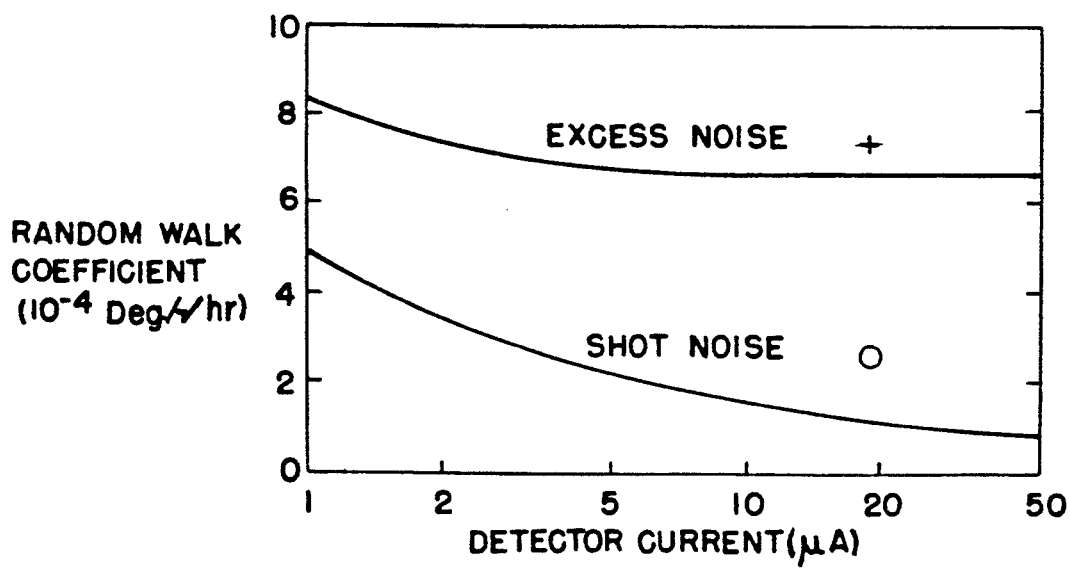
FIG. 6(B) illustrates random walk coefficient versus detector current both with (O) and without (+) noise subtraction.

FIG. 6(B) illustrates the experimental random walk coefficients compared with excess noise and shot-noise theory. The results show a factor of three improvement in the random walk coefficient is obtained. The random walk coefficient with noise subtraction is within a factor of 2.2 of the shot-noise theory.

In summary, the gyroscope system of the present application allows new, high levels of input power to be used in a fiber configuration. Further, the gyroscope system of the present invention utilizes a novel intensity noise subtraction technique, which largely overcomes excess noise and allows operation within a factor of 2.2 of the shot-noise limit.

Further, although the gyroscope system with noise substraction of the present application has been illustrated in an open-loop gyro, it is equally applicable to a closed-loop gyro.

As a result, the gyroscope system of the present application reduces excess noise and random walk in high sensitivity fiber gyros by utilizing the intensity noise subtraction technique illustrated in the preferred embodiment of the present application. Combined with the potential of the multicore fiber sources for increased available power, the gyroscope system with noise substraction of the present application provides a powerful approach to the development of high-sensitivity fiber optic gyroscopes.

With the invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What is claimed and desired to be secured by Letters Patent of the United States is:

1. A gyroscope system comprising:
   a fiber gyroscope for detecting and amplifying a gyro signal containing a noise component to produce an amplified gyro signal containing a first noise component;
   fiber delay means, coupled to said fiber gyroscope, for delaying, detecting, and amplifying a noise component of gyro input light to produce an amplified second noise component; and
   noise reduction means for reducing the first noise component of the amplified gyro signal by amplitude-modulating the amplified second noise component with the amplified gyro signal to produce an amplitude-modulated noise component and subtracting the amplitude-modulated noise component from the amplified gyro signal to produce a reduced noise gyro signal.

2. The gyroscope system of claim 1 wherein:
   said gyroscope system is an open loop gyroscope system.

3. The gyroscope system of claim 1 wherein:
   said gyroscope system is a closed loop gyroscope system.

4. The gyroscope system of claim 1 wherein:
   said gyroscope system is an all-fiber system.

5. The gyroscope system of claim 1 wherein:
   said fiber gyroscope includes a superfluorescent fiber source.

6. The gyroscope system of claim 5 wherein said superfluorescent fiber source includes:
   a laser diode array for producing a laser beam,
   a lens for focusing the laser beam,
   an Nd-doped active fiber responsive to the focused laser beam for developing the gyro input light,
   a dichroic mirror for isolating said laser diode array from said Nd-doped active fiber; and
   an isolator for isolating said Nd-doped active fiber from feedback of the gyro signal.

7. The gyroscope system of claim 6 wherein:
   said laser diode array has a wavelength of 0.81 $\mu$m and said isolator operates at a wavelength of 1.06 $\mu$m.

8. The gyroscope system of claim 6 wherein said Nd-doped active fiber is a double clad Nd fiber which includes:
   an Nd core,
   a first cladding layer of $SiO_2$ and approximately rectangular in shape,
   a second cladding layer of soft fluoro-polymer, and
   an outer coating of hard polymer;
   wherein a numerical aperture between said first and second cladding layers is 0.4.

9. The gyroscope system of claim 1 wherein:
   said fiber gyroscope includes:
      a fiber coil having a preselected length;
      a fiber coupler coupled to said fiber coil;
      first means for developing and transmitting the gyro input light through said fiber coupler into said fiber coil;
      a first fiber polarizer disposed between said first means and said fiber coil, said first fiber polarizer having a first transmission axis; and
      second means coupled to said first means for detecting and amplifying the gyro signal from said gyro coil; and
   said fiber delay means includes:
      a second fiber polarizer coupled to said first means and having a second transmission axis disposed substantially parallel to said first transmission axis of said first fiber polarizer of said fiber gyroscope;
      a fiber delay having a length substantially equal to the preselected length of said fiber coil of said fiber gyroscope; and
      third means coupled to said fiber delay for amplifying and detecting the noise component of the gyro input light.

10. The gyroscope system of claim 1 wherein said noise reduction means includes:
    first coupling means for AC-coupling the amplified second noise component to produce an AC-coupled second noise component;
    multiplying means for multiplying the AC-coupled second noise component with a portion of the amplified gyro signal, to produce the amplitude-modulated noise component;
    second coupling means for AC-coupling the amplified gyro signal to produce an AC-coupled gyro signal; and
    subtracting means for subtracting the amplitude-modulated noise component from the AC-coupled gyro signal to produce the reduced noise gyro signal.

11. The gyroscope system of claim 10 wherein said noise reduction means includes:
    lock-in amplifier means for demodulating the reduced noise gyro signal.

12. A method of reducing a noise component of a gyro signal from a gyroscope fiber coil of a gyro system, said method comprising the steps of:

(a) detecting and amplifying the gyro signal from the gyroscope fiber coil to produce an amplified gyro signal containing a noise component;

(b) delaying, detecting, and amplifying a noise component of gyro input light to produce an amplified noise component; and (c) amplitude-modulating the amplified noise component with the amplified gyro signal to produce an amplified-modulated noise component; and (d) subtracting the amplitude-modulated noise component from the amplified gyro signal to produce a reduced noise gyro signal.

13. The method of claim 12 wherein the gyroscope system is an open loop gyro system.

14. The method of claim 12 wherein the gyroscope system is a closed loop gyro system.

15. The method of claim 12, wherein the gyroscope system is an all-fiber gyroscope system.

16. The method of claim 12 further including the steps of:

polarizing the gyro signal before step (a); and
polarizing the noise component of the gyro input light parallel to the polarized gyro signal before step (b) to produce a polarized noise component; and wherein:

said delaying step of step (b) includes the step of delaying the polarized noise component by a fiber delay of a length equal to a length of the gyroscope fiber coil.

17. The method of claim 12 wherein said step (c) includes the sub-steps of:

(c) (1) AC-coupling the amplified noise component to produce an AC-coupled amplified noise component;

(c) (2) multiplying the AC-coupled amplified noise component by a portion of the amplified gyro signal to produce an amplitude-modulated noise component;

(c) (3) AC-coupling the amplified gyro signal to produce an AC-coupled amplified gyro signal; and (c) (4) subtracting the amplitude-modulated noise component from the AC-coupled amplified gyro signal to produce the reduced noise gyro signal.

18. The method of claim 17 wherein said step (c) further includes the sub-step of:

(c) (5) demodulating the reduced noise gyro signal.

* * * * *